United States Patent [19]
Kobalter

[11] 3,860,134
[45] Jan. 14, 1975

[54] FLEXIBLE NOZZLE FOR A THRUST VECTOR CONTROL SYSTEM

[75] Inventor: Gerald F. Kobalter, Sacramento, Calif.

[73] Assignee: Aerojet General Corporation, El Monte, Calif.

[22] Filed: July 26, 1972

[21] Appl. No.: 275,379

[52] U.S. Cl............................ 239/265.43, 285/235
[51] Int. Cl............................................ B64c 15/06
[58] Field of Search................. 239/265.43, 265.19; 285/229, 235

[56] References Cited
UNITED STATES PATENTS

| | | |
|---|---|---|
| 2,703,109 | 3/1955 | Saville............................ 205/235 X |
| 3,249,306 | 5/1966 | Altseimer.................. 239/265.43 X |
| 3,482,783 | 12/1969 | Nebiker et al............. 239/265.43 X |
| 3,534,908 | 10/1970 | Coleman et al................ 239/265.43 |

*Primary Examiner*—Allen N. Knowles
*Attorney, Agent, or Firm*—Mark C. Jacobs

[57] ABSTRACT

A flexible nozzle is disclosed for use in a thrust vector control system having a main conically shaped body portion comprised of helically wound alternating layers of an elastomeric material and a reinforcement material bonded together in a fluid-tight manner. The nozzle further includes exit and entrance portions integral with the body portion and comprised of a reinforcement material alone.

25 Claims, 11 Drawing Figures

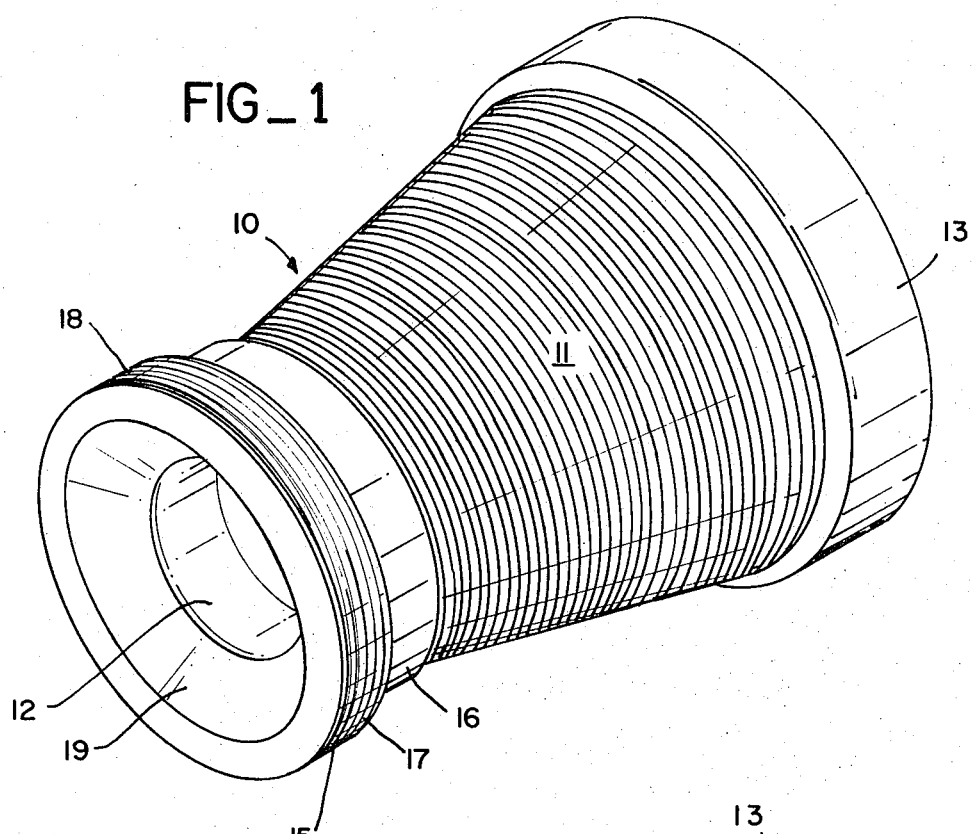
FIG_1
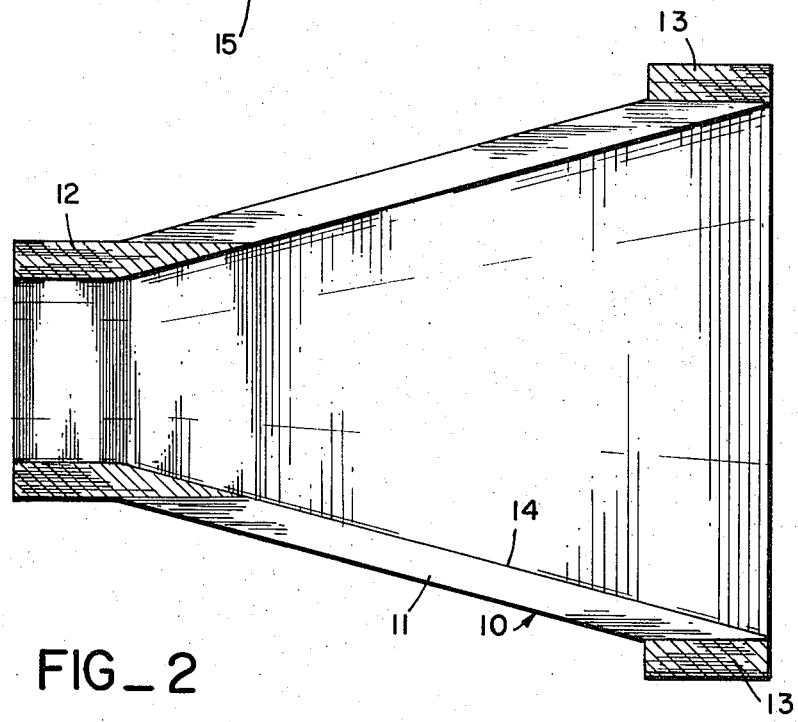
FIG_2

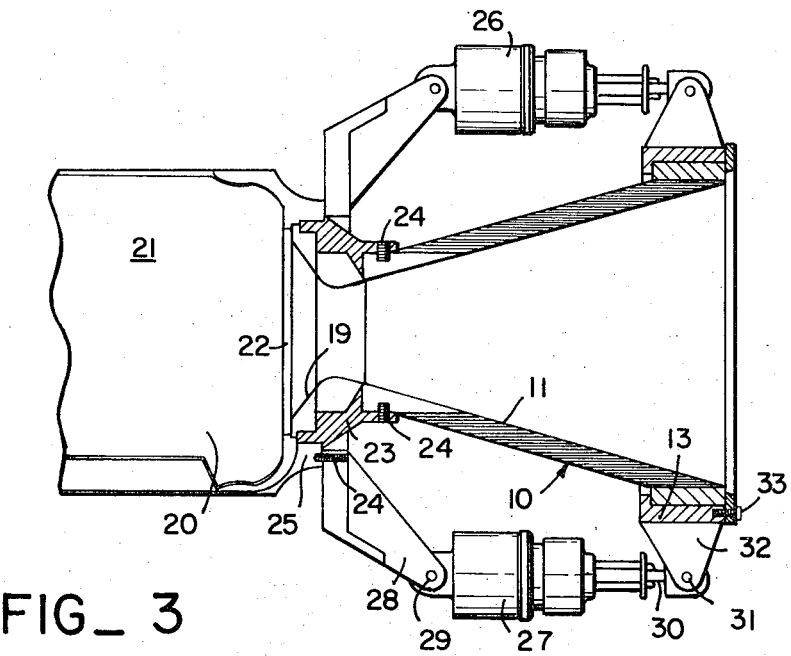
FIG_3
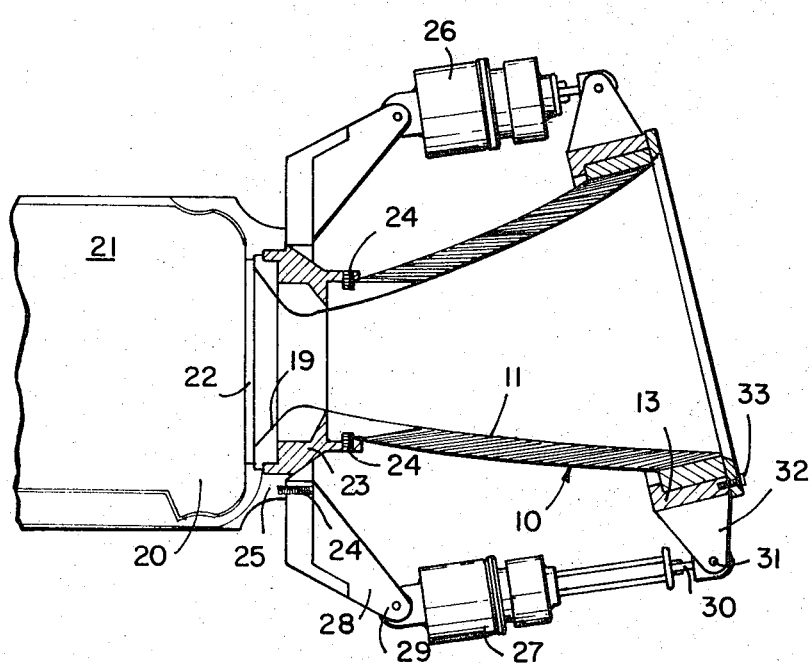
FIG_4

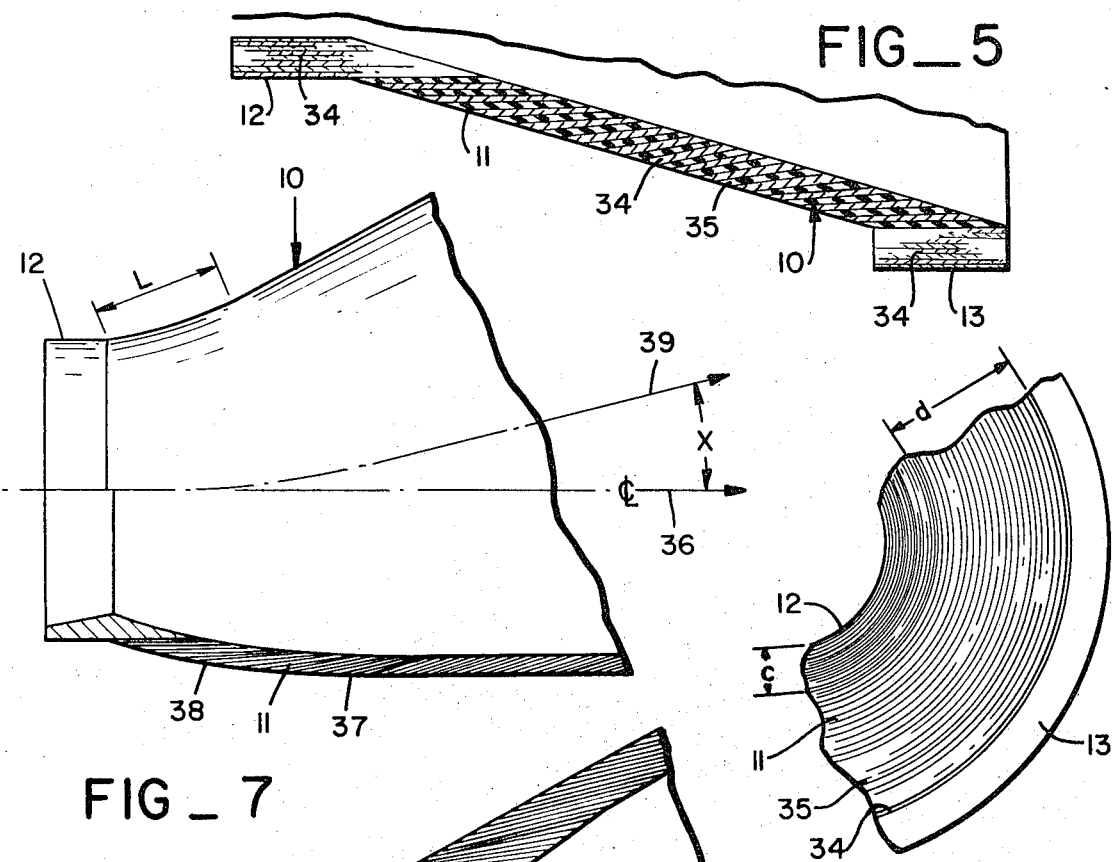
FIG_5
FIG_7
FIG_6
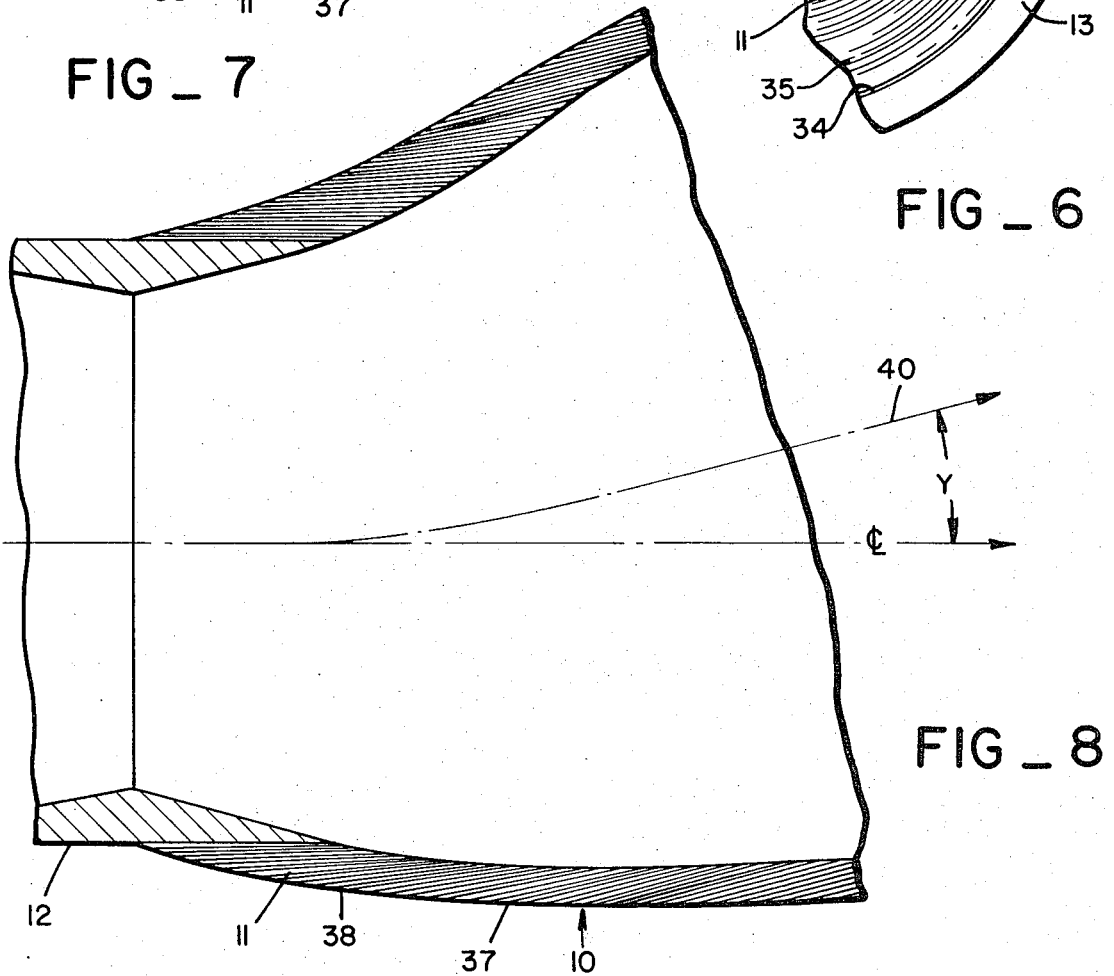
FIG_8

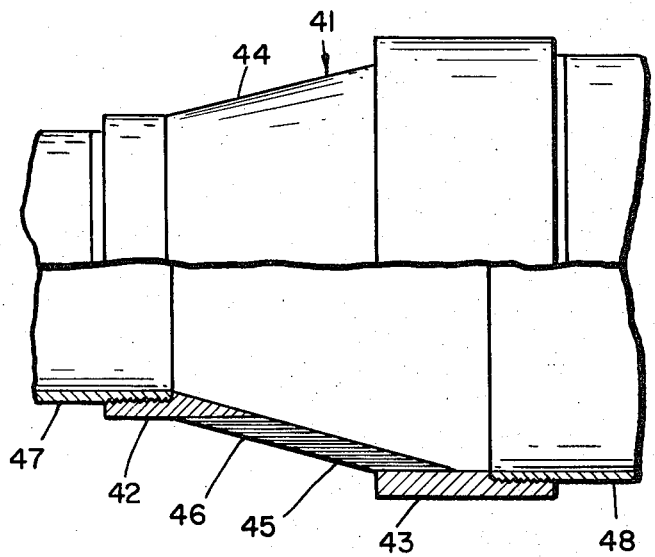
FIG_9
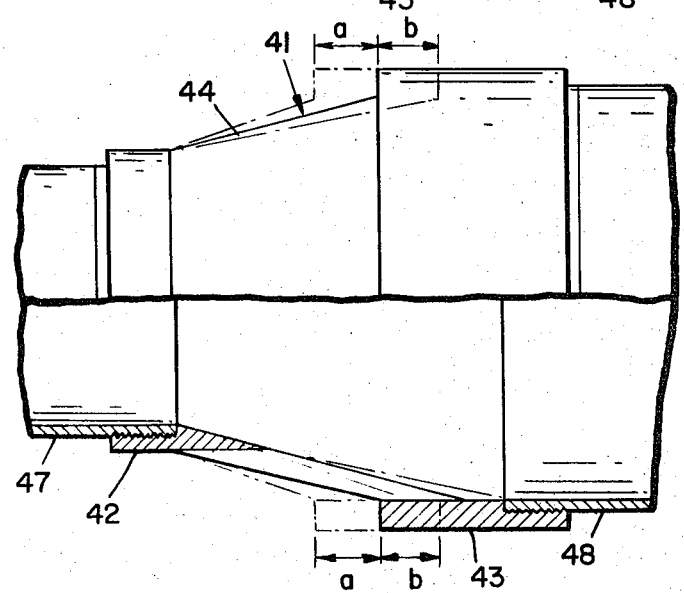
FIG_10
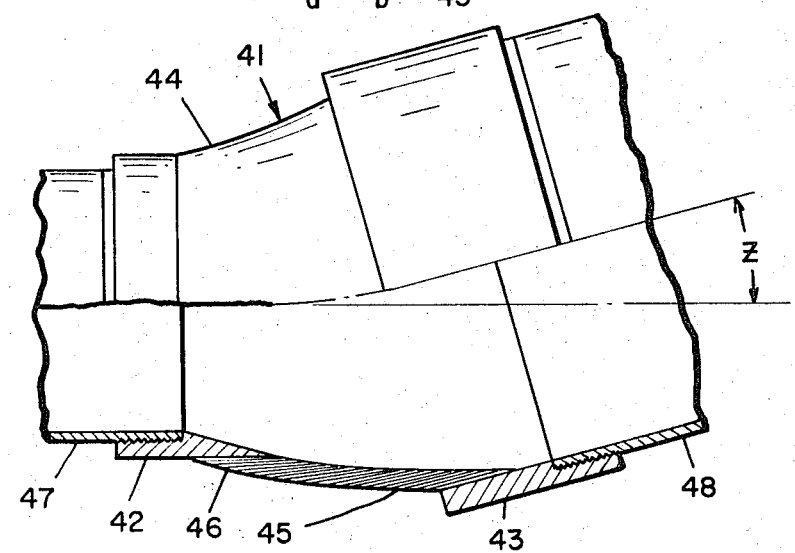
FIG_11

FLEXIBLE NOZZLE FOR A THRUST VECTOR CONTROL SYSTEM

BACKGROUND OF THE INVENTION

1. Field of the Invention

The invention relates to flexible joints; and, more particularly, to a flexible nozzle which can be used as a rocket nozzle or for coupling rigid sections of ducts, piping and the like.

2. Description of the Prior Art

It is well known in the art of missiles, rocket and the like to provide movable nozzles which are cantable in one or more planes of motion to provide thrust direction, or thrust vector, control. In general, it has been found that a single nozzle and thrust vector control system is superior over multiple arrangements and affords many advantages in simplicity, lower inert weight, overall complexity, etc. Such prior art devices, however, have been based on the universal joint principle, or have utilized flexible and/or articulated nozzle systems. In general, such devices have proved unworkable in significant respects, take up a considerable amount of space, are unwieldy, ineffective in operation, etc.

Since such flexible joints are also useful for coupling any structural members which are required to be moved relative to each other in an omnidirectional manner and may also be required to withstand fluid pressure or structural loads, such as frequently encountered in pipe lines and ducting, there exists a need for a joint which provides the desired flexibility while at the same time it also provides sufficient rigidity for withstanding pressure and structural loads in a less expensive but more efficient manner.

SUMMARY OF THE INVENTION

It is an object of this invention to provide an improved flexible joint in the form of a nozzle or the like which is pressure-tight yet deformable.

It is a further object of this invention to provide a structurally sound deformable joint for containing and redirecting pressurized flowing systems.

It is a still further object of this invention to provide a rocket nozzle for a rocket motor or the like which can be compressed, stretched and deflected angularly by externally applied forces to both redirect flow and provide for misalignment and thermal growth in systems requiring pressure integrity.

These and other objects are preferably accomplished by providing a nozzle having a main conically shaped body portion comprised of helically wound alternating layers of an elastomeric material and a reinforcement material bonded together in a fluid-tight manner. The nozzle further includes exit and entrance portions integral with the body portion and comprised of a reinforcement material alone. The layers are preferably formed from continuously wrapped strands of the materials and form a pressure-tight deformable conic segment on the nozzle. The end attachments of the conic segment are the exit and entrance portions of the nozzle and may be formed by continuing the wrapping of the same reinforcement material (or by another suitable reinforcement material).

BRIEF DESCRIPTION OF THE DRAWINGS

FIG. 1 is a perspective view of the nozzle of my invention having a threaded collar installed thereon;

FIG. 2 is a vertical view, partly in diagrammatic cross section of the nozzle alone of FIG. 1;

FIG. 3 is a vertical, partly sectional, view of a rocket motor assembly utilizing the nozzle of FIGS. 1 and 2;

FIG. 4 is a perspective view of a portion of the assembly of FIG. 3 showing the flexing action of my nozzle;

FIG. 5 is a cross-sectional view taken through a portion of the wall of the main body portion of the nozzle of FIGS. 1 and 2;

FIG. 6 is an end view of the nozzle alone of FIGS. 1 and 2 looking down into the nozzle from the exit portion to the entrance portion thereof;

FIGS. 7 and 8 are vertical, partly sectional, views showing two deflections of the exhaust stream from the rocket chamber in the rocket motor assembly of FIG. 3;

FIG. 9 is a vertical, partly sectional, view of a nozzle in accordance with my invention used in a duct or pipeline system;

FIG. 10 is a vertical, partly sectional view showing the axial compression of expansion of the nozzle in the system of FIG. 9; and FIG. 11 is a vertical, partly sectional view of the nozzle in the system of FIG. 9 used to accommodate angular off-set.

DESCRIPTION OF THE PREFERRED EMBODIMENT

Referring to FIG. 1 of the drawings, a nozzle 10 is shown having a main conically shaped body portion 11 and entrance and exit portions 12 and 13, respectively. The term "exit" portion refers to the end of the nozzle out of which fluids, gases, or the like are discharged. Thus, exit portion 13 closes off the large end of nozzle 10 and, as can be seen in FIGS. 1 and 2, is generally ring-shaped and of a thickness generally related to the thickness of main body portion 11. "Entrance" portion 12 refers to the portion of the nozzle 10 through which fluids, gases, or the like pass into the nozzle 10. Thus, as shown in FIG. 2, entrance portion 12 is also generally ring-shaped, the thickness of the entrance portion 12 also being generally related to the thickness of main body portion 11.

Of course, the inner and outer diameters of entrance portion 12 are considerably less than the inner and outer diameters of exit portion 13. For example, the inner and outer diameters of entrance portion 12 may be on the order of 2 ½ inches and 3 ½ inches, respectively. The inner and outer diameters of exit portion 13 may thus be about 7 ½ inches and 8 ½ inches, respectively. The overall length of nozzle 10 may be on the order of 10 ½ inches or so with a generally uniform wall thickness of about 1 inch. As can be seen in FIG. 2, the main body portion 11 tapers generally uniformly outwardly from entrance portion 12 to exit portion 13. A basic taper of about 15° 30' may be used. At any rate, the main body portion blends into the entrance and exit portions 12 and 13 to provide a smooth interior 14 for the nozzle 10. The length of entrance portion 12 may be on the order of 1 ½ inches while the length of exit portion 13 may be on the order of 1 ¾ inches.

As can be seen in FIG. 1, a threaded collar 15 may be provided on the entrance portion 12. Collar 15 includes an annular portion 16 bonded or otherwise secured about the periphery of entrance portion 12. Annular portion 16 then extends outwardly away from nozzle 10 to form a generally conical portion 17 (foreshortened in view in FIG. 1). A threaded, generally annular, portion 18 is integral with portion 17. In this manner, the entire nozzle assembly may be threadably secured to a rocket motor, duct, or the like.

As can also be seen in FIG. 1, the convergent portion 19 of nozzle 10 may be flared outwardly and rearwardly as shown. This may be accomplished by providing a separate section which is secured to entrance portion 12 of nozzle 10 and held in position thereon by collar 15.

The main body section 11 forms the most important feature of my invention. Specifically, and preferably, the entire section 11 is formed of helically wrapped alternating layers or strands of a reinforcement material and a resilient material. These materials are bonded together, either by a suitable adhesive means, or, preferably, by co-curing the different materials. Many materials are suitable; for example, any of the various reinforced plastic materials which are available in tape form may be used as the reinforcement material. Also, any metallic strip material sufficiently flexible to permit helical wrapping may be used as the reinforcement material, such as glass fiber, cloth or silica fabric impregnated with a phenolic resin, without modifiers or additives.

For the resilient material, any precured or uncured calendered strips of natural, synthetic or silicone-based elastomers may be used, such as natural rubber, ethylene propylene rubber and polyisoprene rubber. In any event, the reinforcement material and the resilient material may be bonded together by a suitable adhesive when they are not co-cured together. If co-curing is used, I prefer to coat the reinforcement material with an uncured elastomer of the same chemical composition as the resilient material (or, in the case of reinforced plastics, impregnate the plastic material with uncured elastomer) prior to wrapping the alternate layers or plies of material. These materials are then finally co-cured, preferably under pressure and at a suitable temperature, resulting in a fluid- and pressure-tight deformable conic segment of the nozzle 10 (i.e., body portion 11). The co-curing permits partial migration of the resilient material into any voids in the reinforcement material, thus assuring good cohesive strength while eliminating leak paths. Thus, the final structure can withstand internal or external pressures without leakage or delamination.

If both components have been precured, they are merely bonded together by a suitable adhesive during the wrapping process or prior thereto.

Suitable materials which may be used are resin-impregnated broadgoods, a term well known in the art, such as a high temperature and ablation-resistant fiber reinforced plastic for the reinforcement material and low-temperature elastomeric material for the resilient material, which combination then co-cures into a unitary structure. A suitable co-curing pressure may range from about 15–150 psi.

The temperature used in co-curing the rubber and phenolic system is normally in the area of 300° F. but it could be less if held at temperature for a considerable time. Normal time at 300° F. is 3 hours to assure full cure of both materials. To minimize the amount of rubber extrusion, a vacuum bag system may be used to apply about 14 psi to the component; however, other configurations using a reinforcement material that is simply coated with an elastomer may be cured at pressures of 150–1000 psi in a conventional autoclave or a hydroclave.

Preferably, the entrance and exit portions 12 and 13 are formed of the same (or similar) reinforcement material and this may also be accomplished by continuously wrapping plies or strands of the reinforcement material alone, i.e., without alternating layers of resilient material. Of course, the strands at the entrance and exit portions 12 and 13 may overlap each other or otherwise be wrapped to result in a wall thickness generally equal to the maximum wall thickness of main body portion 11 (see FIG. 2 and the foregoing discussion thereof).

Such wrapping may be carried out using conventional tape wrapping machinery or the like as is well known in the art. Thus, the strands of the two materials may be wrapped about a conically shaped conventional mandrel or the like. If desired, a conventional outer diameter collet or the like may be used to surround the nozzle being formed on the mandrel and thus provide a continuous outer conical surface thereto. Such a collet may be segmented and the segments added at stages of the wrap to securely hold in place those portions of the nozzle that have already been wrapped.

Preferably, the strands of material are wrapped generally parallel to the centerline of the nozzle. The resulting nozzle 10 can be compressed, stretched and deflected angularly — as will be discussed further hereinbelow — by externally applied forces to redirect flow therethrough, to provide for both misalignment and thermal growth in systems requiring pressure integrity, such as rocket motors, pressurized pipelines, etc. The nozzle 10 can thus be used to form a structurally sound deformable joint for containing and redirecting pressurized flow in such systems without loss of pressure integrity. Further, such a joint provides in a single composite structure the capability to withstand structural and pressure loads as well as the ability to withstand fluid, chemical and thermal environment without the necessity for additional protection.

The deflection capability of nozzle 10 may be varied to meet deflection requirements of the system in which it is to be used by varying (1) the amount of the flexible or resilient material used in main body portion 11; (2) the thickness of the wall in this section; (3) the conic half-angle — e.g., as mentioned previously, an angle of between 10° and 20° may be preferably used to form the main body portion 11 of nozzle 10 illustrated in FIG. 2; and (4) the angle of the plies or strands of the materials used to the centerline of nozzle 10 during the fabrication process may be varied (i.e., these angles need not be parallel to centerline).

The preferred smooth curvature of inner wall 14 redirects the flow of fluids therethrough. In the nozzle 10 of FIGS. 1 and 2, the angle of wrap of the plies or strands of the materials used, as indicated above, need not be parallel to the centerline of nozzle 10. This permits either high angular deflection of a normal conic shape or angular deflection of a cone (section 12) with a zero included angle — i.e., a cylindrical section with the attributes of an integrated omnivector cone.

Referring now to FIG. 3, the nozzle 10 of FIGS. 1 and 2 is shown coupled to a rocket motor assembly 20. Assembly 20 includes a chamber 21 having a discharge opening 22 in fluid communication with the interior of nozzle 10. The convergent portion 19 of nozzle 10 is coupled to opening 22 in a fluid-tight manner by means of an adapter ring or flange 23 or the like. As can be seen, the convergent portion 19 is partially submerged in opening 22. Suitable fastening means such as pins 24 are used to attach ring 23 to both nozzle 10 and a mounting base or flange 25 on chamber 21. Suitable bonding means may be used to carry out the foregoing as is well known in the art.

In operation of the rocket motor assembly 20, the nozzle 10 is adapted to take both axial compressive loads due to pressure from motor chamber 21 and the shear loads due to movement of nozzle 10 for thrust vector control. As is well known in the rocket motor assembly art, nozzle 10 may be moved by means such as two or more conventional actuators (such as actuators 26 and 27) attached to both chamber 21 and nozzle 10 (fastening means 24 may thus be used to secure one end of brackets 28 to casing 21 while the other ends of brackets 28 may be pivotally connected, by suitable pins 29 or the like, to the actuators 26, 27). The rods 30 of actuators 26, 27 may be then pivotally secured, as by pins 31 or the like, to a bracketed clamp ring 32 secured, as by fastening means such as pins 33, to exit portion 13 of nozzle 10. In this manner, by movement of the appropriate actuator 26 or 27, which may be hydraulically actuated, as is well known in the rocket art, nozzle 10 may be caused to pivot about a point approximately at the intersection of the centerline of nozzle 10 and the radius of gyration of the main body portion 11 as shown in FIG. 4. When deflected, the nozzle 10 has a self-centering effect in that the resilient material in main body portion 11, as will be discussed further hereinbelow, functions as a large spring system and exerts a force tending to move the nozzle 10 to a normal or non-deflected position. That is, as shown in FIG. 4, upon actuation of the actuator 27, the nozzle 10 deflects, then returns to the FIG. 3 position upon retraction of the rod 30 of actuator 27. Of course, as indicated above, three such actuators may be provided approximately 120° apart. If two actuators are used, they may be mounted about 180° apart. These actuators may be either mechanically, hydraulically, electrically, pneumatically actuated or the like. The smooth, continuous curvature of the inner contour of nozzle 10 results in turning of the supersonic gas stream from rocket chamber 21 with minimal shock losses.

As shown in FIG. 5, a cross-sectional portion of the wall making up main body portion 11 is illustrated. As can be seen, the plies of the two materials may be both generally parallel to the centerline of nozzle 10 and not parallel thereto. Thus, reference numeral 34 refers to the reinforcement material, while numeral 35 refers to the resilient material. The angle of deflection of each ply or layer of each material may change along with the diameter of the ply (across its surface). The greater the diameter of the ply, the less it will flex. Also, the width of each layer may be varied. In other words, the flexing of main body portion 11 may be changed at any point therealong by such variations to provide for areas which would flex to a greater or lesser extent.

Thus, two uniform layers of materials 34 and 35 may be wrapped around a mandrel or the like and portions thereof may be machined off later so the thickness is changed and thus the degree of flexing. As shown in FIG. 6, the area of main body portion 11 approaching the entrance portion 12 of nozzle 10 may be made up of plies of materials 34 and 35 of relatively narrow widths (i.e., area c), then increase in thickness as they approach exit portion 13 to provide for the areas of greatest flexing (i.e., area d). As can be seen, the thickness of the plies of the reinforcement material 34 (indicated for convenience of illustration by the arcuate lines) in this latter area remain relatively constant and much narrower than the plies of the resilient material 35 (as indicated for convenience of illustration by the spacing between the arcuate lines). Of course, the reinforcement material 34 at entrance and exit portions 12 and 13 may be wrapped in any suitable manner to provide the diameters desired. The inner surface of nozzle 10 may then be machined to provide a smooth, continuous curvature to wall 14 throughout. The exterior surfaces may be likewise so machined, if desired. The selection of the outer contour of the nozzle 10 is important in that it, combined with the inner contour, determines the thickness of the cone at any point; thus the width of the ply at that point. The contour of the deflected nozzle 10 is a direct function of the width of the plies at any given diameter, i.e., the thicker the ply, the less deflection of the ply at that point. By proper selection of both the inner and outer contour of the nozzle 10, an optimum contour of the deflected nozzle may be achieved, the stress levels in each ply may be matched, and the torques required to deflect the nozzle 10 may be controlled. The optimum contour will vary as the application of the concept varies; therefore, no single combination of inner and outer contour configuration may be considered as optimum for all applications.

An average thickness of the resilient material may be about 0.03 inches with the average thickness of the reinforcement material being about 0.010–0.030. This would result in a reinforcement to resilient material thickness ratio of about 1.3:1. It is preferable that the resilient ply thickness be as thin as possible for use in a rocket nozzle exit cone to minimize the depth of ablation and char in this material. It is also preferable that as many plies of resilient material as possible be used as this reduces the required actuation torque for any given deflection. For example, it has been found that 0.020 inches is the minimum thickness that calendered strips of uncured rubber may be reasonably formed with existing equipment; therefore, this thickness is preferred. The thickness of the reinforcement plies is a function of the available reinforced plastic materials — 0.012 to 0.027 inches standard. To increase the thickness of reinforcement, multiple plies of reinforcement material were wrapped between the resilient plies — for example three plies of 0.012 inch thick reinforcement for every single ply of 0.020 inch thick elastomer has been used.

The deflection of nozzle 10 when used as a rocket motor or the like is shown in FIG. 7 wherein arrow 36 refers both to the centerline of nozzle 10 and the deflection of flow therethrough. The actuators and other means for deflecting the nozzle 10 and attaching it to a rocket motor or the like are omitted for convenience of illustration. Thus, the nozzle 10, prior to deflection, is similar to that of FIG. 1. In FIG. 7, nozzle 10 is shown deflected to provide turning of the exhaust gases from the chamber of the rocket motor assembly. The external contour of the main body portion 11 is shown compressed at section L; the undeflected reinforcement portion 12 upstream of this section L forms the remainder of the nozzle 10. The resilient material 37 between the plies of reinforcement material 38 is deformed. The plies of the reinforcement material 38 is deflected but not deformed. The remainder of the nozzle 10 at exit portion 13 is deflected but not deformed. The total angular deflection of the nozzle 10 is shown as the deflection of the undeformed exit nozzle at X and the final direction of the fluid flow leaving the nozzle is indicated by the arrow 39.

Upon introduction of any rotational torque, as shown in FIG. 8, the nozzle 10 deforms, causing the exit portion 13 to turn an angle Y with respect to the undeflected nozzle 10 and causes the direction of gas flow from the nozzle 10 to turn as indicated by arrow 40, thus providing a side force vector to the system.

The nozzle 10 of my invention can be used in other systems, if desired, such as in a pressurized pipeline system. Thus, as shown in FIG. 9, a nozzle 41 similar to nozzle 10 may be used in a duct or pipe system. However, it is not necessary that the configuration of such nozzle be the same as the aforementioned nozzle 10. Nozzle 41 of FIG. 9 thus may include an entrance portion 42 and an exit portion 43 similar to entrance and exit portions 12 and 13 of nozzle 10 and of like reinforcement material. The main body portion 44 may be smaller than main body portion 11 of nozzle 10 but, in any event, is made up of windings of helically wrapped strands or plies of alternate sections of resilient and reinforcement materials 45 and 46, respectively. In manufacturing nozzle 41 (and of course nozzle 10), entrance and exit portions 42 and 43 may be fabricated from a continuation of the wrap of the reinforcement material 46 without the resilient material 45.

The flexible joint or nozzle 41 of FIG. 9 is thus capable of being turned, stretched or compressed to accommodate misalignment and thermal growth. A pipe or duct 47 may be attached to the smaller end flange or entrance portion 42 of the nozzle 41, by any suitable means, which portion 42 is an integral part of the flexible main body portion 44 consisting of the reinforcement plies 46 and the resilient plies 45. This deformable portion 44 is attached as an integral portion of the larger end flange or exit portion 43 by the continuous wrapping process. The larger flange or exit portion 43 is attached to another pipe or duct 48 completing the pressure-tight pipe or duct assembly including a flexible nozzle member 41. The means for such attachments may be carried out by any suitable adhesive or fastening means.

FIG. 10 shows the pipe or duct system of FIG. 9 accommodating axial compression or expansion. The amount of axial deformation which can be accommodated is shown for a compressed (a) and a stretched (b) system as compared to the undeformed (or normal) system. The pertinent parts of the normal system include the smaller pipe or duct 47, the smaller attachment flange or entrance portion 42, the reinforcement plies 46, the resilient plies 45, the larger attachment flange or exit portion 43, and the larger pipe or duct 48. In this system, flow can be in either direction.

Finally, FIG. 11 shows the pipe or duct system of FIG. 9 used to accommodate angular offset. In this system, the two ducts are misaligned at an angle Z without losing pressure integrity. Flow can be in either direction.

In all of the foregoing, the terms "entrance" and "exit" are relative, depending of course on the direction of fluid flow. Also, the configuration of main body portion 44 and the entrance and exit portions 42 and 43 may be varied as discussed hereinabove.

The angular displacement of the exit plane — at exit portions 13 and 43 — is a summation of the angular displacement of the individual laminates. This provides a relatively smooth internal nozzle contour that provides gas flow turning with a minimum amount of perturbations and subsequently an acceptable degree of surface erosion.

It can be seen from the foregoing that I have described a nozzle which can be used in coupling rigid components which may be moved relative to one another in a pressurized flowing system. The entire main body portion of my nozzle may flex to redirect pressurized flow. My nozzle can be manufactured more inexpensively than prior art devices, takes up less space, weighs less, and has potential for higher effectiveness than such devices since the angle of deflection is less to obtain the same effect.

The low-cost fabrication of my nozzle permits high production rate manufacturing thereof. The low-volume requirements for my nozzle permits ease in packaging, particularly in diameter-limited tactical rocket motors. My nozzle is capable of high thrust deflection angles at low power requirements.

The thrust vector deflection of my nozzle may be accomplished by the aforementioned actuators which apply a moment to the major diameter of the main body portion of my nozzle. This causes a combined shear tensile and compressive deformation in each of the layers of resilient material. This deformation, which may be controlled through preselected inner and outer contours of the main body portion 11, provides a smooth, continuous curvature of the contour of inner wall 14 resulting in turning of the pressurized fluid stream — which may be a supersonic gas stream, as in rocket motors or the like — with minimal shock losses. The selection of the appropriate inner and outer contours of main body portion 11 provides protection to individual laminates of the resilient material thus eliminating excessive strain concentrations. The use of nozzles of my invention results in a reduction of the strain on the resilient laminates, thus reducing the actuation torque required to obtain the desired angle of thrust deflection.

Although the nozzle of my invention has been described as adaptable to use in a pipeline system or the like, it is particularly applicable in the aviation field. For example, future tactical air-launched missiles will require maneuvering capabilities several times that of the target aircraft in order that they may be successfully deployed while engaged in close-in aerial combat maneuvers. Also, future tactical air-launched missiles may require multi-mission capability in order to counter a wide variety of enemy threats with a limited inventory of missile types. This increased emphasis on improved performance in terms of range, velocity control and maneuverability of tactical air-launched missiles may require the use of high angle thrust vector control in conjunction with thrust modulation control. There is thus a need for a lower-cost, high-angle, high-response thrust vector control system that can be adapted to any solid rocket motor system, tactical or strategic.

It is to be understood that while the apparatus and method herein described constitute preferred and/or exemplified embodiments of the invention, the invention is not to be limited thereto for it will be evident to those skilled in the art that numerous changes and

I claim as my invention:

1. In a thrust vector control system for a rocket motor or the like, a nozzle comprised of:
   a main generally conically shaped body portion terminating at one end in an entrance portion and terminating at the other end in an exit portion;
   substantially the entire main body portion of said nozzle consisting essentially of helically wound alternating layers of a resilient material and a reinforcement material bonded together in a fluid tight and self-supporting manner; and
   the exit and entrance portions of said nozzle being comprised of a rigid material.

2. The system of claim 1 wherein the rigid material in said exit and entrance portions is the same as the reinforcement material in said main body portion.

3. A rocket motor assembly comprising:
   a rocket chamber;
   a nozzle operatively connected to said chamber for receiving gases discharged therefrom, said nozzle having a main generally conically shaped body portion terminating at one end in an entrance portion connected to said chamber and in fluid communication therewith and terminating at the other end in an exit portion, substantially the entire main body portion of said nozzle consisting essentially of helically wound alternating layers of a resilient material and a reinforcement material bonded together in a fluid tight and self-supporting manner with the exit and entrance portions being comprised of a rigid material; and
   actuating means coupled to both said rocket chamber and said nozzle for flexing said nozzle.

4. The assembly of claim 3 wherein said exit and entrance portions are comprised of the same reinforcement material in said main body portion.

5. A flexible joint assembly for a pipe-line or the like comprising:
   a first duct in fluid communication with said pipeline and operatively connected thereto;
   a flexible joint operatively connected to said first duct for receiving fluids discharged therefrom, said joint having a main generally conically shaped body portion terminating at one end in an entrance portion connected to said first duct and in fluid communication therewith and terminating at the other end in an exit portion connected to a second duct also operatively connected in said pipeline in fluid communication therewith, substantially the entire main body portion of said joint consisting essentially of helically wound alternating layers of a resilient material and a reinforcement material bonded together in a fluid-tight and self-supporting manner with the exit and entrance portions being comprised of a rigid material.

6. The assembly of claim 5 wherein said exit and entrance portions are comprised of the same reinforcement material in said main body portion.

7. A method for forming a flexible joint for use in a pressurized fluid discharge system or the like comprising the steps of:
   continuously and helically wrapping alternating layers of an uncured resilient material and an uncured reinforcement material to thereby form a generally conically shaped portion of said joint;
   continuing the wrapping of only the reinforcement material in a generally cylindrical manner at both ends of said conically shaped portion to form entrance and exit portions of said joint; and
   subsequently co-curing such materials.

8. The method of claim 7 wherein the steps of wrapping layers of such materials includes the steps of wrapping elongated flattened strands of such materials in a manner whereby at least some of the elongated strands have their longitudinal planes generally parallel to the centerline of the joint and at least some of the elongated strands have their longitudinal planes at an angle with respect to the centerline of the joint.

9. The method of claim 7 wherein the step of wrapping layers of such materials includes the step of wrapping alternate layers of an uncured elastomeric material and an uncured glass fiber material.

10. The method of claim 9 wherein the step of co-curing said materials includes the step of curing said materials at elevated temperature and pressure.

11. The method of claim 9 wherein the step of wrapping alternate layers of such materials includes the step of wrapping such materials in a manner wherein the ratio of the total reinforcement material to the resilient material is about 1.3:1.

12. The method of claim 11 wherein the step of wrapping alternate layers of such materials includes the step of alternately wrapping strands of a resilient material having an average thickness of about 0.03 inches or less and strands of a reinforcement material having an average thickness in the range of about 0.010-0.030 inches per strand.

13. The method of claim 9 including the step of machining both the interior of said joint in a manner forming a generally smooth curvature thereto and the exterior thereof in a manner forming a generally smooth contour thereto after co-curing said materials.

14. A rocket motor assembly comprising:
   a rocket chamber;
   a nozzle operatively connected to said chamber for receiving bases discharged therefrom, said nozzle having a main generally conically shaped body portion having at one end an entrance portion connected to said chamber and in fluid communication therewith and at the other end an exit portion, at least a portion of the main body portion of said nozzle being comprised of helically wound alternating layers of a resilient material and a reinforcement material bonded together in a fluid tight manner with the exit and entrance portions being comprised of a rigid material, at least some of the alternating layers of the resilient material and the reinforcement material being elongated flattened strands of such materials having their longitudinal planes generally parallel to the centerline of the nozzle and at least some of the elongated strands have their longitudinal planes at an angle with respect to the centerline of the nozzle; and
   actuating means coupled to both said rocket chamber and said nozzle for flexing said nozzle.

15. A flexible joint assembly for a pipeline or the like comprising:
   a first duct in fluid communication with said pipeline and operatively connected thereto; and a flexible joint operatively connected to said first duct for receiving fluids discharged therefrom, said joint having a main generally conically shaped body portion having at one end an entrance portion connected to said first duct and in fluid communication therewith and at the other end an exit portion connected to a second duct also operatively connected in said pipeline in fluid communication therewith, at least a portion of the main body portion of said joint being comprised of helically wound alternating layers of a resilient material and a reinforcement material bonded together in a fluid tight manner with the exit and entrance portions being comprised of a rigid material, at least some of the alternating layers of the resilient material and the reinforcement material being elongated flattened strands of such materials having their longitudinal planes generally parallel to the centerline of the joint and at least some of the elongated strands have their longitudinal planes at an angle with respect to the centerline of the joint.

16. In a thrust vector control system for a rocket motor or the like, a nozzle comprised of:

a main generally conically shaped body portion having at one end an entrance portion and at the other end an exit portion;

at least a portion of the main body portion of said nozzle being comprised of helically wound alternating layers of a resilient material and a reinforcement material bonded together in a fluid tight and self-supporting manner; and the exit and entrance portions of said nozzle being comprised of a rigid material, said rigid material in said exit and entrance portions being the same as the reinforcement material in said main body portion.

17. The system of claim 16 wherein at least some of the alternating layers of the resilient material and the reinforcement material are elongated flattened strands of such materials having their longitudinal planes generally parallel to the centerline of said nozzle and at least some of the elongated strands have their longitudinal planes at an angle with respect to the centerline of the nozzle.

18. The system of claim 17 wherein said resilient material is an elastomeric material and said reinforcement material is a glass fiber material.

19. The system of claim 18 wherein said elastomeric material is a natural rubber elastomer and said glass fiber material is a phenolic impregnated glass material.

20. A rocket motor assembly comprising:

a rocket chamber;

a nozzle operatively connected to said chamber for receiving gases discharged therefrom, said nozzle having a main generally conically shaped body portion having at one end an entrance portion connected to said chamber and in fluid communication therewith and at the other end an exit portion, at least a portion of the main body portion of said nozzle being comprised of helically wound alternating layers of a resilient material and a reinforcement material bonded together in a fluid tight manner with the exit and entrance portions being comprised of a rigid material of the same reinforcement material as in said main body portion; and actuating means coupled to both said rocket chamber and said nozzle for flexing said nozzle.

21. The assembly of claim 20 wherein said resilient material is an elastomeric material and said reinforcement material is a glass fiber material.

22. The assembly of claim 20 wherein at least some of the alternating layers of the resilient material and the reinforcement material are elongated flattened strands of such materials having their longitudinal planes generally parallel to the centerline of the nozzle and at least some of the elongated strands have their longitudinal planes at an angle with respect to the centerline of the nozzle.

23. A flexible joint assembly for a pipeline or the like comprising:

a first duct in fluid communication with said pipeline and operatively connected thereto;

a flexible joint operatively connected to said first duct for receiving fluids discharged therefrom, said joint having a main generally conically shaped body portion having at one end an entrance portion connected to said first duct and in fluid communication therewith and at the other end an exit portion connected to a second duct also operatively connected in said pipeline in fluid communication therewith, at least a portion of the main body portion of said joint being comprised of helically wound alternating layers of a resilient material and a reinforcement material bonded together in a fluid tight manner with the exit and entrance portions being comprised of a rigid material of the same reinforcement material as in said main body portion.

24. The assembly of claim 23 wherein said resilient material is an elastomeric material and said reinforcement material is a glass fiber material.

25. The assembly of claim 23 wherein at least some of the alternating layers of the resilient material and the reinforcement material are elongated flattened strands of such materials having their longitudinal planes generally parallel to the centerline of the joint and at least some of the elongated strands have their longitudinal planes at an angle with respect to the centerline of the joint.

* * * * *